Nov. 17, 1959   A. SMITH ET AL   2,913,058
LAWN EDGER
Filed Nov. 22, 1954   7 Sheets-Sheet 2

INVENTORS
*Alexander Smith*
BURTON D. BAGGS, JR.

BY  *A. Yates Dowell*

ATTORNEY

Nov. 17, 1959  A. SMITH ET AL  2,913,058
LAWN EDGER
Filed Nov. 22, 1954  7 Sheets-Sheet 3

INVENTORS
*Alexander Smith*
BURTON D. BAGGS, JR.

BY

ATTORNEY

Nov. 17, 1959     A. SMITH ET AL     2,913,058

LAWN EDGER

Filed Nov. 22, 1954     7 Sheets-Sheet 4

INVENTORS
*Alexander Smith*
BURTON D. BAGGS, JR.

BY

*A. Yates Dowell*

ATTORNEY

Nov. 17, 1959 A. SMITH ET AL 2,913,058
LAWN EDGER
Filed Nov. 22, 1954 7 Sheets-Sheet 5

INVENTORS
*Alexander Smith*
BURTON D. BAGGS, JR.

BY *A. Yates Dowell*

ATTORNEY

Nov. 17, 1959

A. SMITH ET AL 2,913,058

LAWN EDGER

Filed Nov. 22, 1954

INVENTORS
ALEXANDER SMITH
BURTON D. BAGGS, JR.

BY

ATTORNEY

Nov. 17, 1959

A. SMITH ET AL

2,913,058

LAWN EDGER

Filed Nov. 22, 1954

INVENTOR
*Alexander Smith*
*Burton D. Baggs, Jr.*

BY

*A. Yates Dowell*
ATTORNEY

United States Patent Office 2,913,058
Patented Nov. 17, 1959

2,913,058

LAWN EDGER

Alexander Smith and Burton D. Baggs, Jr., Sanford, Fla.

Application November 22, 1954, Serial No. 470,193

12 Claims. (Cl. 172—15)

The present invention relates to the power equipment for cultivating and more particularly to equipment for producing a neat appearance around the edges of sidewalks, flower beds, and the like.

The present invention is an improvement over our prior application, Serial No. 408,803, filed February 8, 1954, for a gardening machine.

Heretofore, it has been customary to produce a shallow narrow trench along the edges of sidewalks, curbs and the like, to prevent overhanging grass from causing an unsightly appearance and this trenching has frequently been done by hand with the use of a hoe or by various other expedients and frequently this detail of gardening has been neglected, resulting in an unfinished appearance to gardens, parkways and the like. Although some effort has been made to use power equipment, the results have not been entirely satisfactory and the construction according to our previous application has worked out well for many uses but has not been readily usable along curved outlines since the position of the wheels was relatively fixed with relation to the frame.

An object of the present invention is to overcome the difficulties experienced with previous forms of power gardening equipment and produce a cultivator which may be accurately guided around curves, trees, buildings and the like.

A further object of the invention is to provide a gardening machine which is stable and has a low center of gravity and which can be run in forward and reverse directions.

A still further object of the present invention is to simplify prior constructions, reduce manufacturing costs and improve performance.

A further object of the invention is to provide brushing means for cleaning the edge of a sidewalk during the cultivating operation or by a separate operation.

Another object of the invention is to provide gardening equipment which can be accurately controlled for cultivation at any selected point without danger of cultivating in other areas.

Another object of the invention is to provide a means for mounting a cultivating disc with the face thereof substantially flush with the end of the shaft on which it is mounted.

A further object is to provide an attachment for a rotating shaft for cutting vegetation close to buildings, tombstones and the like, without danger of marking such buildings, tombstones or the like.

A further object of the invention is to provide a power driven gardening machine which may be used in limited space and can readily be changed from a cultivating machine to a trimming machine for cutting vegetation.

Another object of the invention is to provide a trenching machine with guarding structure to prevent a trenching implement from striking obstructions which are substantially flush with the surface.

A further object is to provide a machine for producing a trench in a surface while preventing marring of obstructions in the path of the trenching cutter and in which the machine remains accurately guided regardless of the striking of an obstruction.

A further object is to provide a method of trenching, cultivating and cutting by means of which a single source of power can be used for the various operations.

Other and further objects will be apparent as the description proceeds and upon reference to the drawings, wherein.

Referring more particularly to Figs. 1 to 5 of the drawings, a generally rectangular frame is formed from spaced inverted U-shaped side members 10 and 11 having their free ends connected together at the front by a cross member 12 and at the rear by a cross member 13. The frame is movably supported on a set of ground engaging wheels 14 which are rotatably supported on stub shafts screwed into plugs pressed into the ends of the forward and rear cross frame members, the wheels being provided with conventional permanently lubricated bearings and being removably retained by acorn nuts 15. A U-shaped handle portion includes a leg 16 pivotally connected to the side frame member 10 and a leg 17 pivotally connected to the side member 11, such legs 16 and 17 being connected by bight portion 18 from which bight portion a pair of studs 18A extend and telescopically and detachably receive the legs of an H-shaped handle portion 19 which is removably retained on the studs by bolts 18B permitting disassembly for packing. It will be evident that the machine may be guided in its movement by means of the handle grips 20 on outwardly extending upper portions of handle portion 19 by the operator pushing or pulling on such handle grips. For fixing the position of the handle with relation to the frame, a slotted strut member 21 is pivotally attached at one end to the bight portion 18 of the inverted U-shaped handle portion. The slot receives an inwardly extending threaded stud fixed on the upper end of a tubular guide member 23 while a thumb screw 22 clamps the strut member 21 in fixed position relative to the tubular guide member 23. Tubular guide member 23 has its lower end fixed to the side member 10 by welding or the like.

Projecting inwardly from the bight portion of the side frame member 11 are a plurality of U-shaped brackets 24, 25 and 26 provided with apertures 27 therethrough. A vertically extending rod 28 having a plurality of apertures 29 therethrough for registry with apertures 27 in the U-shaped brackets 24, 25 and 26 is maintained in adjusted position by means of a bolt 30. A handle 29A is provided for manipulation of the rod 28.

A vertically extending shaft 31 is slidably mounted in the vertical tubular guide 23 and has a transverse pin 32 extending through the top thereof and to which a flexible cable 33 has one end fixedly connected, the cable passing through the upper end of the tubular guide 23. The upper end of the tubular guide 23 is bifurcated and front and rear pulleys 34 and 35 are rotatably mounted therein with the cable 32 passing therebetween. The cable passes through an aperture 36 in the bight portion 18 of the inverted U-shaped handle portion and has an S-shaped hook 37 at its free end, such S-shaped hook being fastened in one of the apertures 38 of the handle portion 19.

A motor supporting cradle is formed by a pair of transverse members 38 and 39 which have reverse bends at their right ends and are pivotally attached to the lower end of the vertically adjustable rod 28 by means of a bolt or the like 40. Extending upwardly from the left ends of the transverse members 38 and 39 are loop members 41 and 42 which have threaded nuts 43 and 44 fixed to the inside of the upper bight portions (Fig. 5) for receiving adjusting screws 45 and 46, the adjusting screws being secured in fixed position by means of lock nuts 47 and 48. L-shaped brackets 49 and 50 are secured to the loop members 41 by means of bolts 51 and 52, respectively, which bolts pass through apertures in the adjacent legs of the L-shaped members and through the loop portion of the loops 41 and 42 and are fixed by means of suitable nuts and washers on the inner sides of the loop members 41 and 42, the adjusting screws 45 and 46 serving to fix the position of the L-shaped brackets relative to the loop members.

Fixedly secured to the outwardly extending legs 55 and 56 of the L-shaped bracket members is a drive shaft housing 57 which is secured by welding or the like to the lower edges of the legs 55 and 56. Within the drive shaft housing 57 is a drive shaft 58 which is rotatably mounted in suitable permanently lubricated bearings 59, 59. The legs 55 and 56 of the L-shaped bracket are provided with registering apertures therethrough and the vertical shaft 31 is provided with a registering aperture while a bolt 60 passes through such registering apertures for pivotally connecting the parts.

From the above description it will be evident that the angularity of the drive shaft housing with the drive shaft therein may be varied by means of the adjustment obtainable by raising and lowering the vertically adjustable rod 28 and securing such rod in fixed position in one of the U-shaped brackets or lugs 24, 25 or 26, the supporting cradle pivoting about vertically extending shaft 31. Also, the shaft 31 may be raised and lowered by means of the cable 33 and the adjustment obtained by S-shaped hook 37 in one of the apertures 38 of the H-shaped handle member 19. A lever action may be obtained in this cable adjustment by loosening the thumb nut 22 and releasing the strut brace 21 permitting the handle to be used for the raising and lowering operations. Also, the handle may be used in the full line position or in the dotted line position depending on whether the machine is moved forwardly or reversely.

Mounted on the cradle formed by members 38 and 39 is a suitable motor supporting plate 61 which may be in sections supported on the transverse members 38 and 39 or may extend between such members thereby additionally rigidifying the cradle. The motor 62, such as a gasoline engine is adjustably mounted on the supporting plate or plates 61 by means of suitable bolts and nuts 63 in a convenient manner. Since the motor is of conventional design detailed description is excluded but the motor carries the usual power shaft 64 on which are mounted a pair of pulleys 65 and 66 for driving belts 67 and 68 which in turn drive pulleys 70 and 71 which are fixed to the main drive shaft 58 by suitable means such as set screws, keys or the like. The shaft 58 is prevented from endwise movement by means of the thrust bearings 59 and the pulleys 65 and 66 are accurately aligned with pulleys 70 and 71, the belts being adjusted to the proper degree of tension by loosening bolts 51 and 52 and turning adjusting screws 45 and 46 to obtain the desired degree of tightness in the belt, the bolts 51 and 52 and locking nuts 47 and 48 thereafter being tightened to maintain the adjusting screws in fixed position. By this simple adjustment, the drive shaft housing 57 is bodily moved relative to the motor and the strain is taken by the adjusting screws 45 and 46 and therefore proper driving relation is maintained with a minimum of parts.

Carried by the outer end of shaft 58 are a plurality of cultivating discs 72, 73 and 74. These discs preferably are secured as by welding or the like to internally threaded nuts 75, 76 and 77, the shaft 58 having a threaded end 78 for receiving such discs. The threads 78 also may serve to prevent the discs from being located too far inwardly on the shaft 58 and alternatively abutment washers 79 may be fixed on the shaft for limiting the inward position of the cultivating discs.

Figure 6:
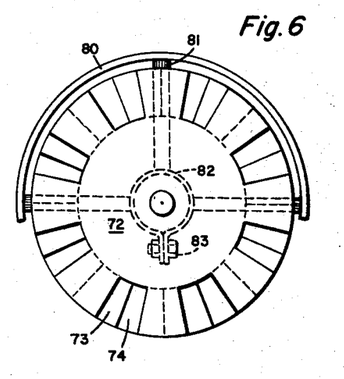
Fig. 6, an elevation of the cutter discs and guard taken on line 6—6 of Fig. 4.

For preventing injury to the operator and reducing danger from flying particles, a semi-cylindrical guard 80 having struts 81 fixed thereto is attached to the drive shaft housing 57 by means of strap member 82 through the free ends of which a bolt 83 passes and may be drawn up tightly to retain the guard in adjusted position. It will be noted that the outside cutting disc 72 is substantially flush with the end of the drive shaft 58 thereby permitting cultivation closely adjacent to buildings, tombstones, trees and the like without danger of the drive shaft or a nut thereon scraping the upright surface. Because of the smooth surface contour there is less danger of injury to a person adjacent the machine. The cutting discs are provided with trapezoidal shaped notches between trapezoidal shaped projections and the outer periphery of such cutting discs are in effect segments of generally cylindrical contour. The cutting discs may be sharpened by merely letting the cutting discs while rotating contact a hard surface such as a concrete pavement or the like. It will be noted that the threaded portion 78 is conventional right hand thread. Two cutting discs may be secured to a single nut to maintain the offset relation of the trapezoidal shaped projections and notches to provide a continuous periphery as shown in Fig. 6.

Figure 7:
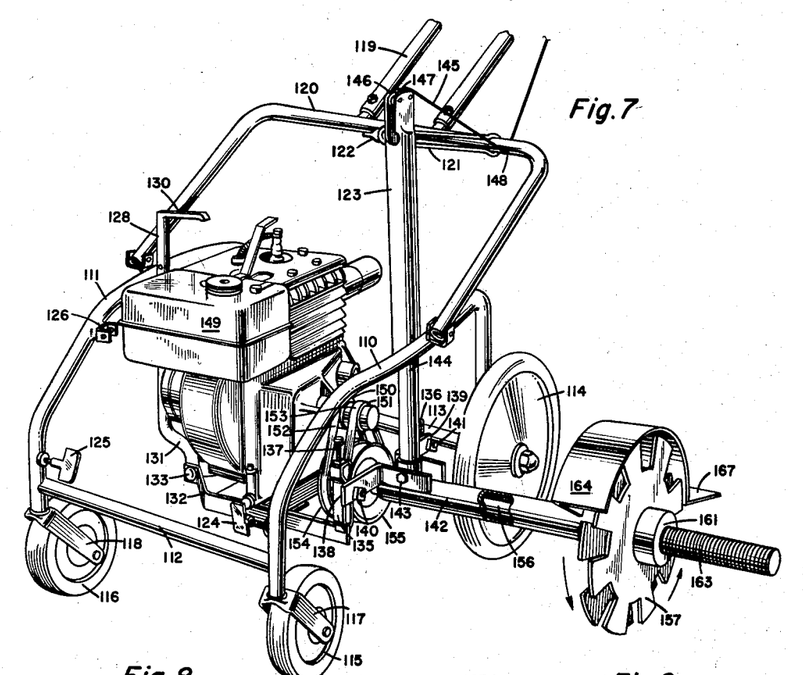
Fig. 7, a perspective of another form of the cultivating machine with caster front wheels and showing an extension drive shaft for additional cultivating discs.
Figures 8, 9:
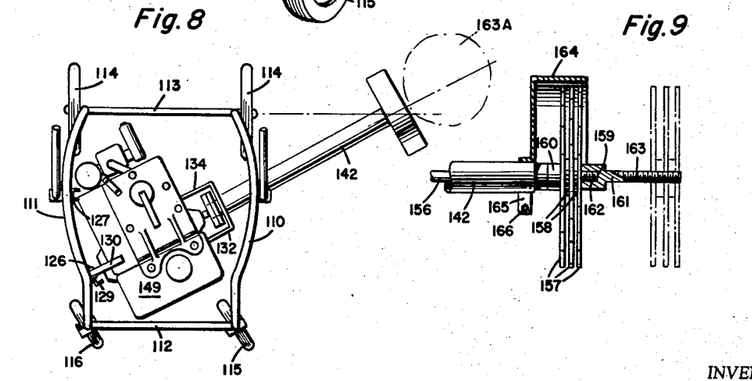
Fig. 8, a plan view on a reduced scale of the modification of Fig. 7 showing an adjusted position of the cultivating disc in line with the axis of the rear wheels.
Fig. 9, a detail of the cutter discs, the extension shaft, and the outer end of the drive shaft housing with parts in section showing the attachment of the extension shaft to the main shaft.

Referring to the modification shown in Figs. 7, 8 and 9, a generally rectangular frame includes inverted U-shaped side members 110, 111 connected at the front by a transverse frame member 112 and at the rear by a transverse frame member 113, such transverse frame members being secured to the inverted U-shaped frame members by welding or the like. Rotatably mounted on the rear are ground engaging wheels 114 which may be mounted in the same manner as the wheels 14 of the first modification. Front or caster wheels 115 and 116 are rotatably supported in forks 117 and 118 having upwardly extending pivot pins which extend into the front tubular portions of the U-shaped frame members 110 and 111, such pivot pins permitting the casters to follow the direction of movement in which the frame is guided. A handle 119 for guiding includes an inverted U-shaped handle portion 120 pivotally connected to the frame and a bracing strut 121 maintains any adjusted position of the handle by means of a thumb nut 122 which is threaded onto a threaded stud projecting from a vertical tubular guide 123 which is fixed at its lower end to the bight portion of the inverted U-shaped frame member 110. The angularity of the caster wheels may be fixed by means of the wing bolts 124 and 125 which are threaded into tubular front legs of the side frame members 110 and 111, the bolts engaging with the upwardly extending pivot pins of the casters to fix the angularity of the casters. The machine may be guided in a straight line path similar to that of the modification shown in Figure 1 or the angularity of the caster wheels may be adjusted as shown in Fig. 8 and the wing bolts 124 and 125 screwed down thereby retaining the casters in their angular positions and causing the machine to be guided in a fixed circular path.

Extending inwardly and attached to the frame member 111 are U-shaped brackets 126 and 127 having apertures therethrough. A vertically extending rod 128 having apertures is adapted to be received in the U-shaped brackets 126 and 127 and is adjustably secured to one of the brackets by a suitable pin or bolt 129 passing through the selected apertures for retaining the rod in position, the rod having a handle 130 for obtaining the desired position prior to the insertion of the bolt 129. Pivotally mounted on the offset lower end 131 of the rod 128 is a cradle for supporting the motor, such cradle including a forward transverse member 132 which is pivotally attached by means of a bolt 133 to the offset lower portion 131 of the rod 128. A similar rear transverse cradle member 134 is also pivotally attached by means of the bolt 133 to the offset lower end 131 of the vertically adjustable rod 128 and the outer ends of the cradle members 132 and 134 are provided with loop members 135 and 136 which are similar to loop members 41 and 42 and carry adjusting screws 137. The loop members are adjustably secured to angle brackets 138, 139 by means of bolts 140 and 141, the other leg of each bracket being fixedly secured to a drive shaft housing 142 by means of welding or the like and such other legs of the L-shaped brackets being provided with apertures for receiving a bolt 143 which passes through both of said other legs and also through a vertically adjustable shaft 144 which is telescopically and rotatably mounted in vertical tubular guide 123. An adjusting cable 145 is secured to the upper end of the vertical shaft 144 and passes between pulleys 146 and 147 at the upper end of tubular guide 123, thence through an aperture 148 in the inverted U-shaped handle member 120. The cable 145 having an S-shaped hook similar to that shown at 37 for engagement with apertures in the handle 119. The vertical adjustment being similar to that described in the previous modification.

Figure 1:
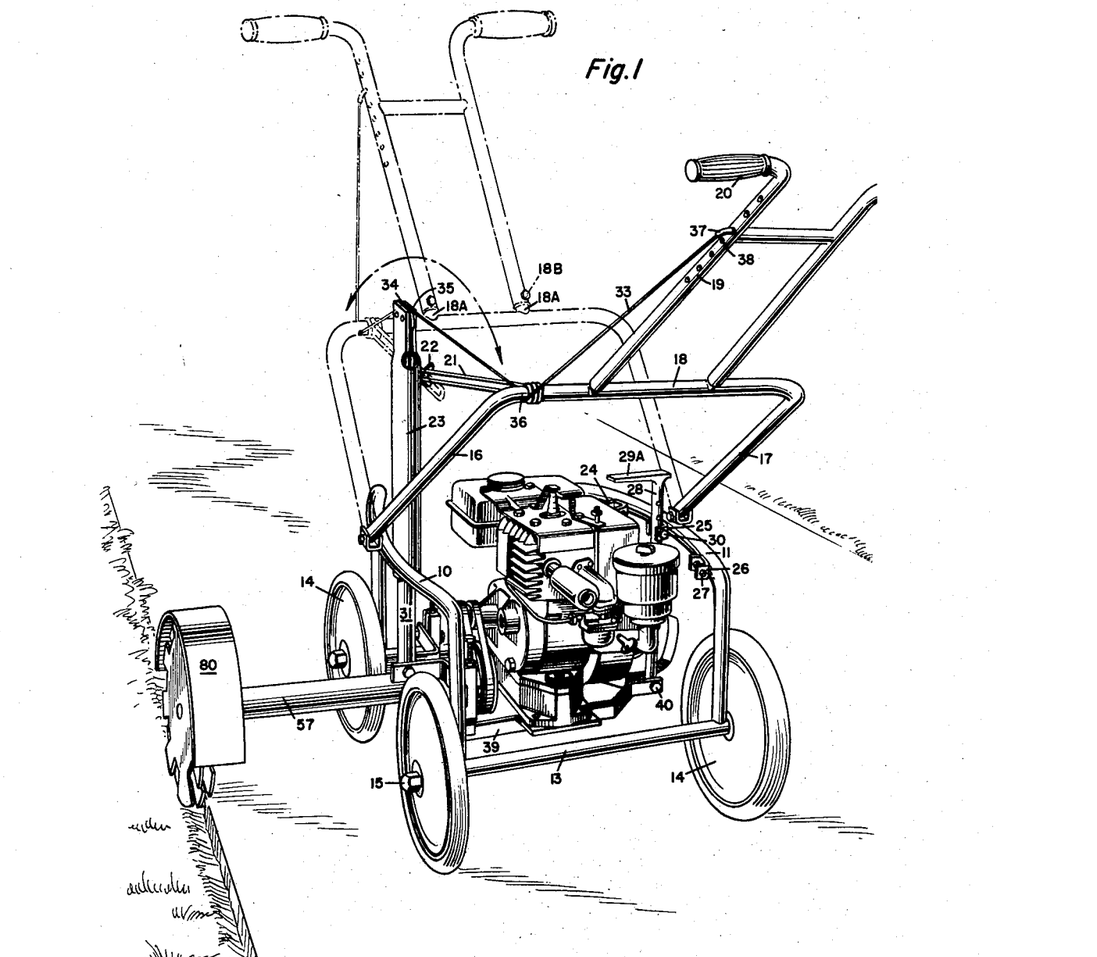
Fig. 1 is a perspective view of one form of the cultivating machine showing the operating handle in full lines in one position and in phantom lines in another position.
Figure 2:
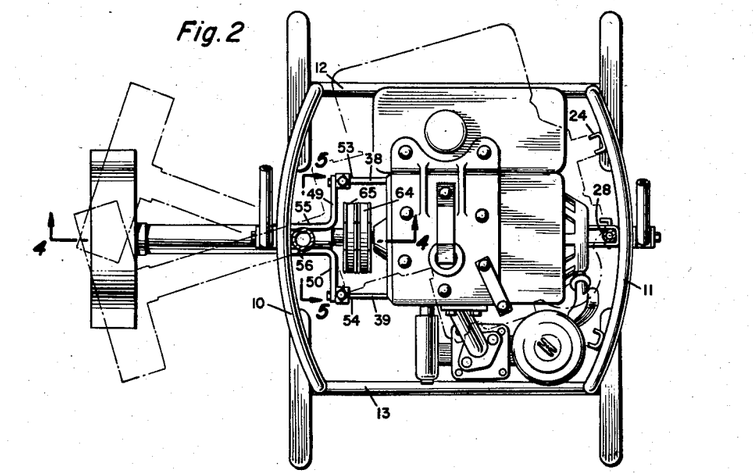
Fig. 2, a top plan view of the machine, with parts in section, with the cultivator in an intermediate position and showing in phantom lines adjusted positions of the cultivator blade and motor.
Figure 3:
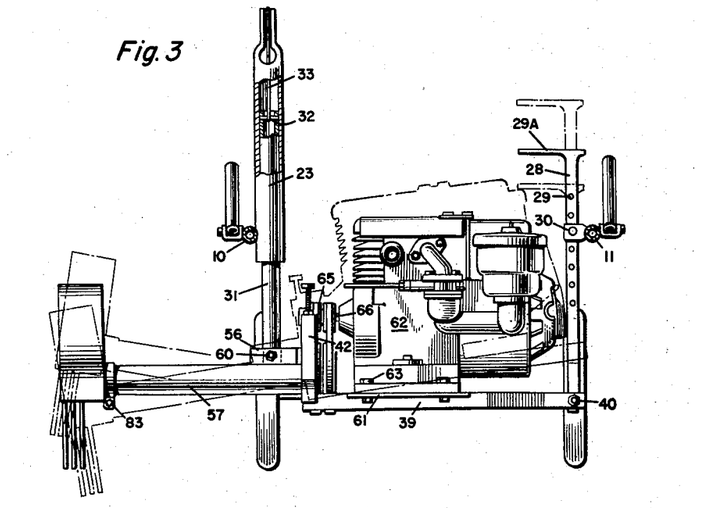
Fig. 3, a rear elevation with parts in section and parts broken away of the machine of Fig. 1.
Figure 4:
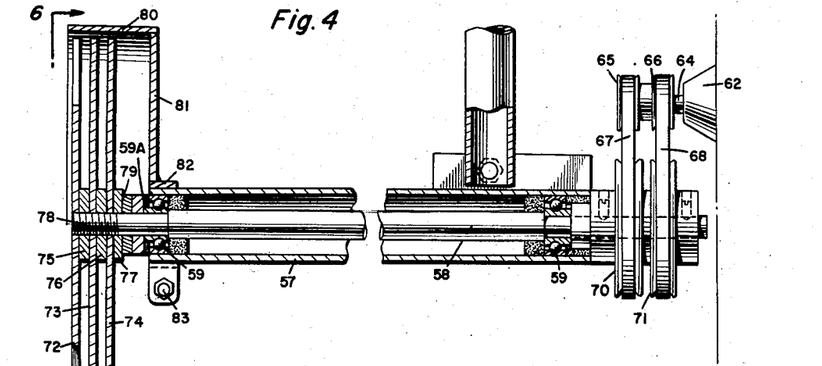
Fig. 4, a section taken on line 4—4 of Fig. 2 showing the cutting disc, drive shaft and the pulley drive.
Figure 5:
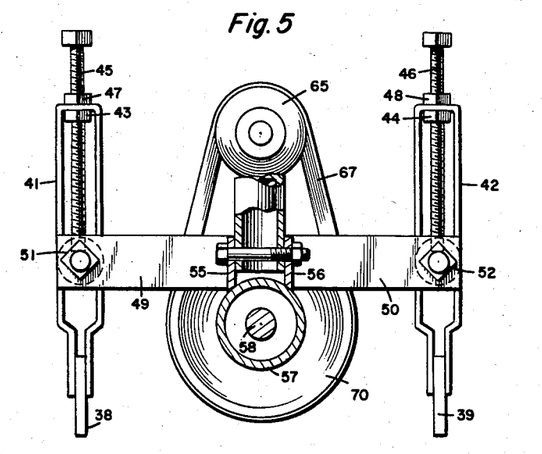
Fig. 5, a section taken on line 5—5 of Fig. 2.

Mounted on the cradle formed by members 132 and 134 is a power plant or gasoline motor 149 which may be attached by any suitable means such as that shown in Figure 1 and such power plant carries a pair of drive pulleys 150 and 151 which in turn drive a pair of belts 152 and 153 which drive pulleys 154 and 155 attached to drive shaft 156, the shaft being rotatably mounted in drive shaft housing 142 by suitable bearing which may be of the permanently lubricated type, such bearings providing for any end thrust to maintain the pulleys in proper driving relation. Secured to the free end of the shaft 156 are one ir more cultivating discs 157 which are preferably fixed on threaded nuts 158, the nuts being right hand thread, the driving relation of the pulleys being such that the torque of the motor tends to screw the cutter discs onto the shaft 156. If only a single disc is used, such disc is preferably mounted on the shaft so that the disc is approximately flush with the outer end 159 of the shaft 156 and if desired or necessary suitable spacing washers 160 may be added to obtain the desired position of the outermost cutter disc. As shown in Figs. 7 and 9, if it is desired to cultivate at a point more remote from the frame, an extension 161 internally threaded at one end is adapted to be screwed upon the threaded portion 162 of the drive shaft 156. Such extension including the threaded portion 163 on which additional cutting discs may be mounted as shown in phantom lines, suitable spacing washers also shown in phantom lines being used as necessary to obtain the proper spacing.

In Fig. 7 the cultivating blades 157 are shown in a position substantially perpendicular to the line of movement of the machine, the rod 128 being located in the U-shaped bracket 127 and the drive shaft being substantially horizontal. In Fig. 8, the vertical rod 128 is fixed in the U-shaped bracket 126 thereby bringing the cutting discs directly over an imaginary line passing through the axis of the rear wheel 114. With the cultivator disc in this position, the entire machine may be rotated about the point of contact of the cutter disc with the ground thereby preventing unintentional cultivation or soil removal. This adjustment permits making a right angled turn where necessary around the edge of the garden or the edge of a piece of pavement or tree 163A.

A suitable guard 164 is mounted on the drive shaft housing 142 by means of a strap 165 and a bolt 166. Such guard including a rearwardly extending apron 167 for preventing flying particles of earth from striking the operator as the cutter discs rotate in the direction shown by the arrow.

From the above description, it is believed that the operation of the cultivating machine will be obvious. Where it is desired to make a straight narrow trench, the machines are adjusted as shown in Fig. 1 or Fig. 7 and with the operator grasping the handle the machine is propelled forwardly with the cultivator disc on the left side. Such cultivator disc being rotated as shown by the direction arrow so that the cultivator disc tends to propel the machine forwardly thereby reducing the effort necessary by the operator. If the direction of movement of the machine is reversed in a trench which is already dug, the trench will be cleaned out, and this can be accomplished by the operator swinging the handle to the position shown in dotted line in Fig. 1 and pushing the vehicle rearwardly. The previously formed trench will be neatly cleaned out of any debris which may have remained from the first pass in the forward direction.

The cutting discs of both forms of the machine can be positioned in any angular relation to the direction of movement of the vehicle and also with respect to the surface over which the machine is operating. Some of the adjustments being shown in full lines in Fig. 8, and dotted lines in Fig. 2 and Fig. 3. The vertical and angular adjustments make it possible for the machine to be guided upon a roadway and the grass trimmed along the edge of a raised curb outside of the roadway and also the machine may be used in a lawn where it is desired to cut a smooth trench and remove the weeds between the lawn and a flower bed. For long curves, the modification shown in Fig. 7 and Fig. 8 is provided so that the angularity of the casters may be fixed and the operator need only guide the machine to a minor extent to produce a neat border around the edge of the curved lawn, roadway or flower bed or the like.

Figure 10:
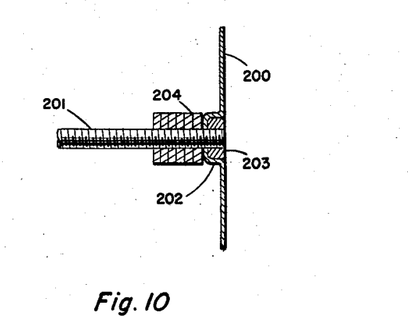
Fig. 10, a detail of another manner of mounting a cultivating disc flush with the end of the shaft.
Figure 11:
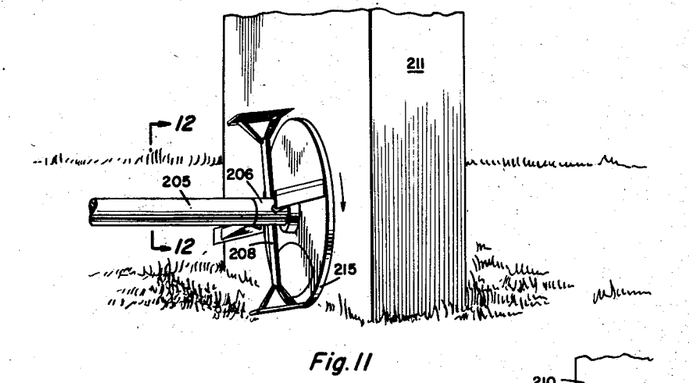
Fig. 11, a perspective of a portion of a driven shaft with a mowing attachment mounted thereon and a guarding disc to prevent the mowing attachment from striking and marking a vertical surface such as a tombstone.
Figure 12:
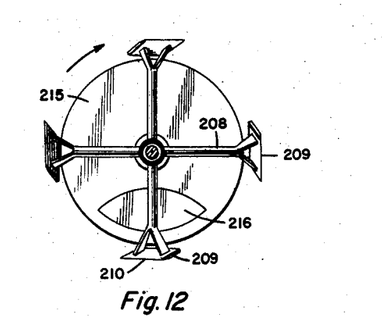
Fig. 12, a section taken on line 12—12 of Fig. 11.
Figure 13:
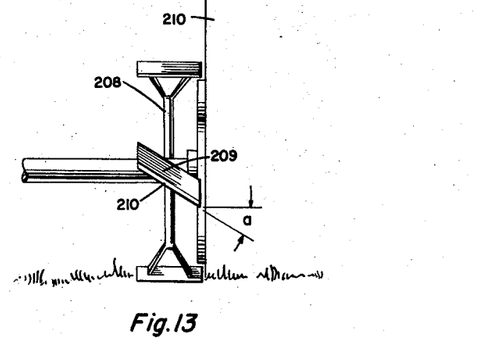
Fig. 13, an elevation of the reel type mower showing a guarding disc contacting a portion of a vertical wall.
Figure 14:
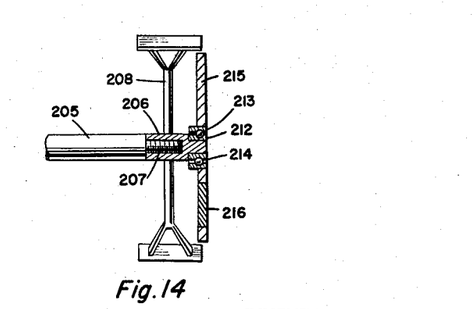
Fig. 14, a section taken through the reel type mower, guarding disc and a portion of the drive shaft showing the attachment of the parts.

Referring more particularly to Fig. 10, another manner of mounting a cultivating disc 200 on a power driven shaft 201 corresponding to shaft 58 or shaft extension 163 is shown to include a hub 202 pressed into the material of the cultivating disc 200 providing a recess which freely receives an attaching nut 203 which is threaded with a right-hand thread to engage the threaded portions of the shaft 201, such nut 203 being loosely received in the inwardly pressed hub 202 and the disc 200 being frictionally held between the nut 203 and a spacing washer 204, such spacing washers being provided in sufficient number to engage against an abutment such as the inner race 59A of the bearing 59. The inner race 59A is prevented from movement inwardly on the shaft 58 by the provision of a suitable abutment, the inner race 58A being pressed on to the shaft 58.

Although the discs such as 200 may be secured together and prevented from relative rotation by suitable keyways, it has been found that the frictional drive is usually sufficient without requiring the expanse of cutting keyways in the disc, thereby resulting in greater strength of the parts and reduction of the danger of fracture of such parts. It will be apparent that a number of the discs similar to discs 157 may be provided in addition to the disc 200 to obtain the desired width of trench to be produced by the cultivating machine.

It has been extremely difficult to cut the grass near vertical obstructions such as buildings, trees, tombstones, and the like with equipment heretofore used and frequently such equipment would produce objectionable marks on buildings and the like resulting in an unsightly appearance as well as causing deterioration thereof.

Referring to Figs. 11 to 14, inclusive, a novel type of rotating mower is provided for mounting upon a power driven shaft 205 which may correspond to shaft 58 or to shaft extension 161 with a suitable source of power and means to position the shaft for horizontal operation or operation at an angle as desired. Fixedly mounted on the shaft is a spider including a central hub 206 which is fixed to the shaft 205 by means of the threaded end 207 of shaft 205 engaging internal threads in hub 206 which prevents relative rotation. Projecting radially outwardly from hub 206 are a plurality of arms 208 each of which carries a cutting blade 209 such cutting blades being mounted at an angle $a$ to the axis of the shaft 205 and the leading edge of each cutter blade being beveled as shown at 210 providing a sharp knife-like edge. The angle of the cutting blades 209 is such as to produce a movement of air inwardly from the outer ends of the blades 208, thereby drawing the grass away from the vertical obstruction such as a tombstone 211, making it possible for the cutters to cut the grass satisfactorily.

Fixed on the outer end of the hub 206 on a reduced portion thereof, is an anti-friction bearing including an inner race 212 rotatably supporting an outer race 213 by means of ball bearings 214 and fixed on the outer race 213 is a guarding disk 215 which is of appreciable thickness so that the outer surface thereof projects outwardly beyond the outer ends of the cutting blades 208. The guarding disc 215 is freely rotatable but is normally maintained in a stationary position by means of a weight 216 mounted in or upon disk 215 so that gravity will urge such weight to the lowermost position and the disk will not normally rotate with the shaft 205.

From the above description the operation of the mowing attachment is believed to be obvious. When the shaft 205 is rotated by a source of power such as motor 62 in the manner described heretofore the cutting blades 208 will be moved in a counter-clockwise direction as viewed from the outer end of the shaft. The direction of rotation as seen from the inboard end of the shaft is shown by the arrow in Fig. 12 and the beveled cutting edges 210 of the blades 209 will cut the grass when the blade is in its lowermost position and such blades will simultaneously act as fan blades to draw the air inwardly which air in turn will blow the grass away from the tombstone 211 or other vertical obstruction and into the path of the cutting knives 208 and such blades of grass will be severed thereby cutting the grass.

Referring more particularly to Figs. 15–18, a gardening machine similar to that shown in Fig. 7 includes inverted U-shaped frames 310, 311 and cross members 312, 313 which are secured together by welding or the like, and such frame is supported by rear wheels 314, 314 and front caster wheels 315, 316. The frame supports a motor 317 upon a suitable cradle which is adjustable by means of a vertical adjusting rod 318 retained in U-shaped lugs 319 or 320, the other end of the cradle being supported for vertical and pivotal adjustment and in the upstanding tubular shaft 321 in a manner similar to that previously described. Adjustably connected to the cradle is the cylindrical drive shaft housing 322 which is suspended from vertical supporting shaft 323 slidable in the tubular guide 321, such vertical supporting shaft 323 being pivotally connected to the drive shaft housing 322 by a pivot stud 324 passing through the L-shaped brackets 325 which L-shaped brackets are fixedly secured to the drive shaft housing 322 and adjustably mounted on the motor supporting cradle. Rotatably mounted within the drive shaft housing 322 is the drive shaft 326 which is driven in the usual way from the motor 317 through belt and pulley drives 327, such shaft being rotatably supported at its outer end by an anti-friction bearing 328.

Figures 16, 17:
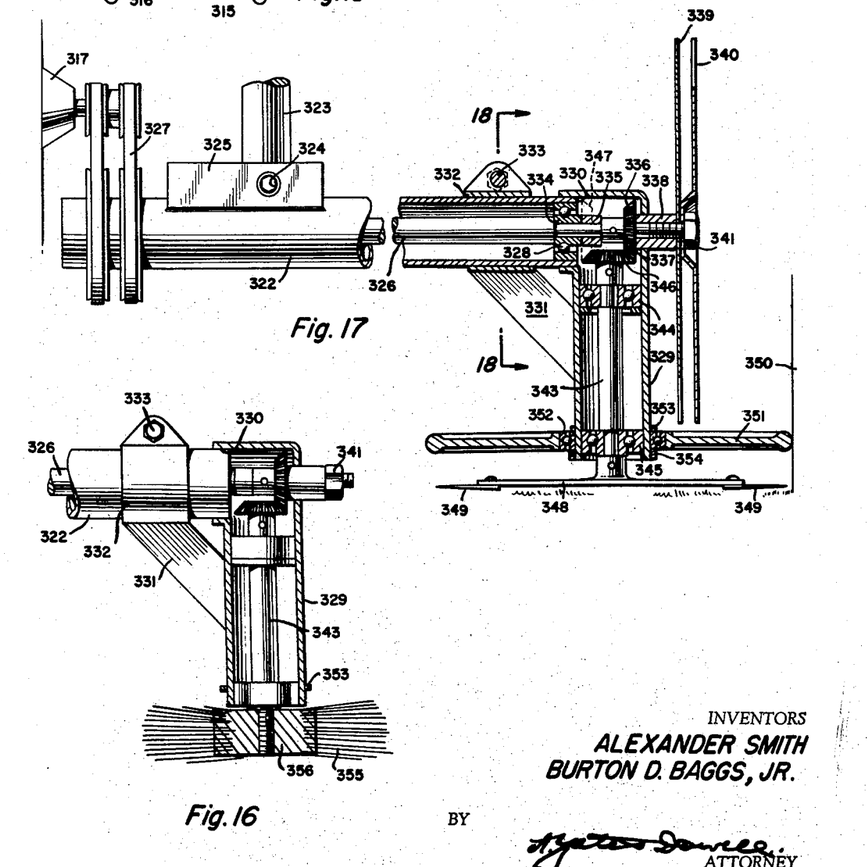
Fig. 16, a longitudinal section of the attachment housing showing a brush mounted thereon.
Fig. 17, a fragmentary vertical section of the drive shaft housing of the gardening machine with an attachment for trimming close to a vertical obstruction and showing the freely rotatable guard disk for preventing marring of a vertical obstruction.
Figure 18:
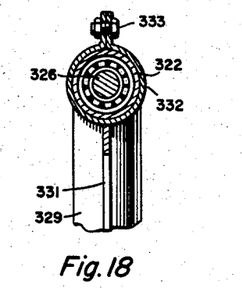
Fig. 18, a fragmentary section with parts omitted taken on line 18—18 of Fig. 17 illustrating the means for retaining the attachment in fixed relation to the drive shaft housing of the gardening machine while permitting angular adjustment thereof.

An attachment housing 329 includes a cylindrical body portion extending as shown at right angles to the drive shaft housing, and such attachment housing includes a socket 330 which snugly receives the outer end of drive shaft housing 322 which arrangement prevents radial movement and permits rotary and axial movement of the attachment housing. A brace 331 secured to the attachment housing at one end is provided with a strap 332 fixed to the other end which strap 332 surrounds the drive shaft housing 322 and by means of a bolt 333 clampingly maintains the parts in fixed assembled condition or upon loosening of such bolt, the attachment may be removed by axial movement from the drive shaft housing 322.

The drive shaft 326 is provided with a shoulder which abuts the inner race 334 of the bearing 328, and such inner race may be somewhat elongated for taking an axial thrust, and a suitable sleeve 335 is provided which abuts against the boss of a bevel gear 336 is fixed on the shaft by a set screw 337 or the like. Said shaft 326 projects outwardly beyond the attachment housing 329 through an enlarged opening and carries a spacing sleeve 338 again which cultivating disks 339 and 340 are held by an attaching nut 341. Suitable sealing rings may be provided for retaining the grease in the bearings and preventing dust from entering the attachment housing. For obtaining access to the set screw 337 one or more openings 342 (Fig. 15) may be provided in the housing 329.

A tool supporting shaft 343 is rotatably mounted within the housing 329 by anti-friction bearings 344, 345 which bearings are preferably of the permanently lubricated type. Upon the upper end of shaft 343 a bevel gear 346 is mounted in meshing engagement with bevel gear 336 for producing rotating motion of shaft 343 in one direction. If it is desired to rotate shaft 343 in the opposite direction, the gear 336 on shaft 326 may be secured in the dotted line position 347.

A cutting bar 348 is fixed to the shaft 343 by suitable means such as threads on the projecting end of the shaft 343, and replaceable cutting blades 349 are carried by the cutter bar 348 for mowing grass or other vegetation. To prevent the cutting blades 349 from contacting and marring vertical obstruction 350 such as a tombstone or the like, a circular guarding disk 351 is rotatably mounted on the exterior of the attachment housing 329 by means of anti-friction bearing 352 which is held in place by a projecting shoulder 353 on the housing against which the inner race abuts and a nut 354 threaded onto the lower threaded end of the housing 329 abuts the other end of the inner race thereby removably securing the guarding disk.

Figure 15:
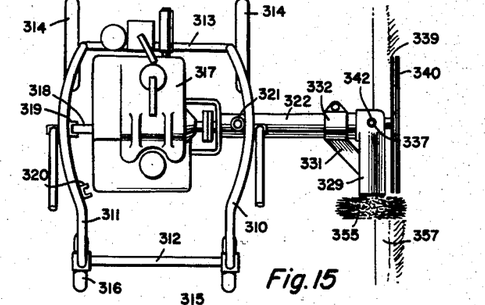
Fig. 15, a top plan view of one form of the gardening machine with an attachment supporting a brush for cleaning a curb or sidewalk following the cultivating blade.

A brush 355 having threaded hub 356 is secured to the tool supporting shaft 343 by threading engagement with the threaded end of such shaft. In Fig. 15 the brush 355 is shown in one operative position so that the debris collecting on the sidewalk or curb 357 will be brushed away simultaneously with the operation of the cultivating disks 339 and 340 thereby saving the cost of manually sweeping such debris after the edging operation.

In Fig. 16 the brush is shown mounted on the attachment with the cutting blades omitted permitting the machine to be used merely as a brushing machine. It will be apparent that a brush having the bristles extending axially of the tool supporting shaft may be substituted for the radially extending bristles if desired. The cutting bar 348 may be used while the cultivating disks 339 and 340 are in place, if desired, but such cultivating disks may be removed to reduce danger to workmen.

The attachment may be swung up out of the way while the cultivating disks 339 or 340 are used in the normal way thereby reducing the time required to change from one operation to another.

Referring more particularly to Figs. 19 to 23, inclusive, a frame or chassis 400 is supported upon ground engaging wheels 401 and carries a motor 402 supported on a cradle 403 which is adjustably mounted on the frame by means of a vertically movable rod 404 and a vertically extending shaft 405 which is raised and lowered by means of a handle in a manner similar to that disclosed in the previous modifications, the lower extremities 406 of the handle being pivotally connected to the frame 400. The cradle is adjustably connected to a drive shaft housing 407 in which a drive shaft 408 is rotatably mounted by means of anti-friction bearings 409 and is driven from the motor 402 by means of a belt and pulley arrangement 410, the shaft 408 being provided with a shoulder which engages the inner race 411 of the anti-friction bearing 409, the outer race being secured to the shaft housing 407 by a pressed fit or the like.

Figure 21:
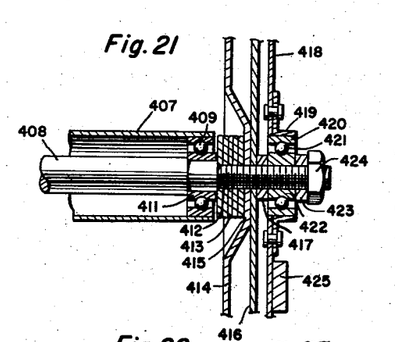
Fig. 21, an enlarged fragmentary section taken generally on line 21—21 of Fig. 20.

Upon further reference to Fig. 21, the shaft 408 is provided with a further reduced portion 412 outwardly of the inner race 411 and said reduced portion being threaded over a substantial length to the outer extremity thereof. A series of washers 413 may be applied to the reduced portion 412 and a cutting disk 414 having an indented hub portion 415 is mounted upon the shaft portion 412 and a plane cutting disk 416 is applied in abutting relation to the hub portion 415 of the cutting disk 414. A spaced collar 417 is next applied to the shaft portion and a star shaped guarding wheel 418 having a hub portion 419 riveted thereto which is rotatably supported by an outer race 420 of an anti-friction bearing 421 is press fitted into the hub, the inner race 422 passing over the shaft portion 412 while a spacing collar 423 abuts the inner race 422 and the entire assembly is retained by means of a retaining nut 424 which is threaded onto the shaft portion 412. For preventing rotation of the star shaped guarding wheel 418, an eccentric weight 425 is provided which normally assures the position shown by gravity. The shaft 408 and shaft portion 412 may rotate freely relative to the guarding disk 418 and drive the cutting disks 414 and 416 while the guarding disk remains substantially stationary.

Figure 19:
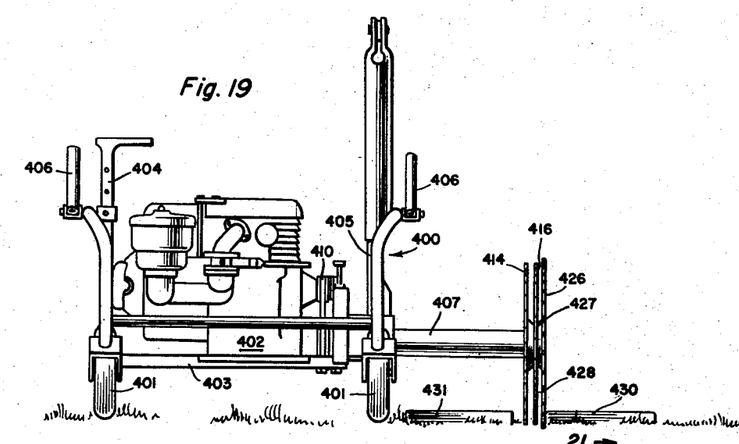
Fig. 19, a front elevation of a form of lawn edging machine with cutter disks and one form of star shaped guarding wheel on the outer end thereof and showing the operation between staggered grave markers.
Figure 20:
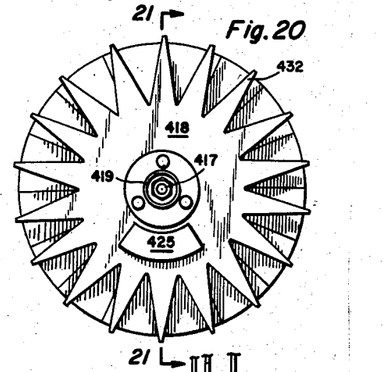
Fig. 20, a side elevation of another form of star shaped guarding wheel on the extremity of the drive shaft and showing the cutting disks of smaller diameter than the guarding wheel.

Referring to Fig. 19, the cutting disks 414 and 416 are mounted in a similar manner to that shown in Figs. 20 and 21. While a guarding disk 426 is provided with an inwardly extending hub portion 427 in which the bearing 421 and the retaining nut 424 are received to provide a flush surface on the outer surface of the guarding disk and the weight 428, for preventing rotation of the guarding disk 426, may be mounted on the inner face of guarding disk 426 so as to provide a flush outer surface.

Figure 22:
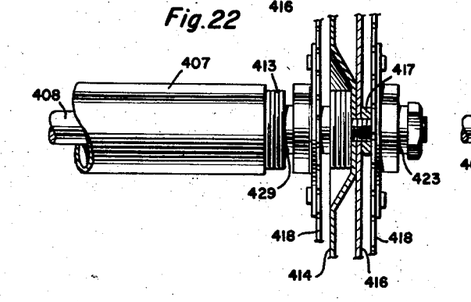
Fig. 22, an elevation on an enlarged scale with parts in section and parts broken away showing a portion of the drive shaft and drive shaft housing with star shaped guarding wheels on the inside and outside of the cutting disks.

In Fig. 22 a pair of star shaped guard wheels 418, 418 are provided on opposite sides of the cutting disks 414 and 416 and suitable spacing is obtained between the various parts by means of washers 413 and spacing collars 429 as required.

Figure 23:
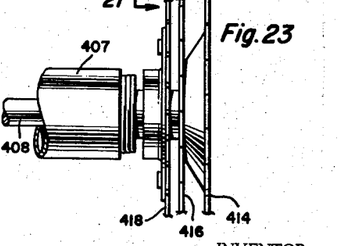
Fig. 23, a fragmentary view of an elevation with parts broken away showing the star shaped guarding wheel on the inside of the cutting disks.

In Fig. 23 the star shaped guarding wheel 418 is mounted on the inner side of the cutting disks 414 and 416 thereby providing for effective guarding on the inner side of such cutting disks.

It is believed that the operation of the modifications of the invention shown in Figs. 19 to 23 should be obvious, the cutting wheels 414 and 416 being rotated in the usual manner and the wheel supported frame 400 being guided by means of the handle to cultivate extremely close to an approximately flush marker 430 such as used in modern memorial cemeteries. The operator guides the machine as close to the marker 430 as possible and as shown in Fig. 19 the guarding wheel 426 is substantially abutting the edge of such marker and effectively protects the marker from the power driven cutting disks 414 and 416. However, if the operator should inadvertently guide the machine so that the cutting blades would pass over the top of the marker 430 the star shaped guarding wheel 426 will ride up onto the upper surface of the marker 430 since the diameter of the star shaped guarding wheel is appreciably greater than the diameter of the cutting disks thereby preventing the power driven cutting disks from engagement with the upper surface of the marker permitting the operator to correct the guiding of the cutting disks without any damage to the marker.

Another marker 431 is shown appreciably behind the marker 430 and offset thereto so that the edging disks 414 and 416 could properly edge the marker 431, but there is danger that the cutting disk 414 would strike the marker 431. To avoid this difficulty, a second guarding disk 418 (Fig. 22) is provided on the inner side of the cutting disk 414 and 416 thereby permitting the operator to edge markers 431 and 430 in one pass of the machine without any possibility of damage to the markers because the inner guard 418 would engage the marker 431 if the operator should guide the machine too close to such marker, the inner disk 418 thereby raising both cutting disks above the marker and preventing any damage thereto. The drive shaft housing 407 with the drive shaft and cutting disks thereon can be raised by the handles 20 where the machine is to be moved from one marker to another to prevent the formation of a trench between such markers and, consequently, the operator may guide the machine and raise and lower the cutter as required for intermittent operation along markers which are spaced apart. The star shaped wheel 418 or 426 has its points 432 of a size to penetrate the sod a sufficient amount to permit efficient action by the cutting disks 414 and 416, but the points are sufficiently blunt that they cannot mar the bronze marker 430 or other obstructions with which such star shaped wheels engage.

It will be apparent that a fender or fixed guard such as that shown at 80 or 164 may be provided for use with the form of the invention shown in Figs. 19 to 23 as well as in the other modifications of the invention.

From the above description it is believed that the operation of the implement supporting attachment will be obvious and that the one machine may serve a multiple purpose as a trimmer, cultivator, trenching machine, brushing machine, and the like.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A lawn edger comprising a generally rectangular frame having spaced right and left inverted U-shaped side members connected by front and rear cross members adjacent the free ends of the legs thereof, a pair of wheels rotatably mounted on the rear legs of the U-shaped side members for rotation about a common axis, a caster wheel mounted on each of the front legs, a vertically extending tubular guide fixedly mounted on the bight portion of the left side member and projecting upwardly therefrom, a handle including an inverted U-shaped handle portion with each leg thereof pivotally mounted on the corresponding side frame member and being of a height to clear the tubular guide, an H-shaped handle member mounted on the bight of said inverted U-shaped handle portion and having outwardly extending hand grips at the upper end thereof, a cradle positioned within said frame, a vertically extending rod pivotally attached to and projecting from the right side of said cradle, a plurality of U-shaped lugs fixed on the inner surface of the right side member, said lugs and rod having registering apertures providing adjustment, a drive shaft housing extending outwardly from the other end of the cradle, an L-shaped bracket on each side of said housing having one leg fixed on the housing and the other leg adjustably connected to the cradle, a vertically extending shaft slidably mounted in said tubular guide and pivotally connected at its lower end to the adjacent L-shaped bracket, guide pulleys on the upper end of said tubular guide, a cable connected to said vertical shaft and passing over said pulleys and through the bight portion of said inverted U-shaped handle portion and having an S-shaped hook at its end, one upright of said H-shaped handle having a plurality of openings for selective entrance of said S-shaped hook providing adjustment, a drive shaft rotatably mounted in said drive shaft housing and having a pair of pulleys on its inner end within the confines of said cradle, means to removably secure a toothed cultivating disk on the outer end of said drive shaft, a motor mounted on said cradle and having two pulleys above the pulleys on said drive shaft, drive belts connecting said motor and drive shaft pulleys, vertical loop members arranged in spaced relation on said cradle adjacent the other legs of said L-shaped brackets, bolts extending through said other legs and said loop members for fixedly securing the housing relative to said cradle, adjusting screws extending from the top of said loop members to the bolts for maintaining the desired adjustment, the angularity of the cutting disk being adjustable in all directions by pivotal motion about and with said vertically extending shaft and by vertical adjustment of said rod in one of said U-shaped lugs, means to fix the plane of operation of said caster wheels relative to said frame, the arrangement being such that the cultivating disk can be moved to a position where the center thereof is in line with the rear wheels to provide for accurate cutting of corners, the handle being swingable forwardly and rearwardly whereby the operator may guide the cultivator in either direction.

2. A gardening machine comprising a pair of inverted U-shaped side frame members arranged in side by side relation, cross members maintaining said U-shaped frame members in fixed position, a ground engaging wheel mounted on each leg of said side members, a tubular guide member arranged in upstanding relation fixed to the bight portion of one of said side members, an upstanding shaft slidably and rotatably mounted in said tubular guide member, a motor support pivotally connected to the lower end of said upstanding shaft, said motor support extending toward the other side member, a rod pivotally connected to the other end of said motor support and projecting upwardly, inwardly extending lugs on the bight portion of said other side member and means for connecting said upstanding rod to selected lugs for varying the elevation and the angularity of the position of said motor support, means for adjusting and fixing the vertical position of said vertical shaft, a motor on said motor support, a drive shaft housing projecting outwardly from said motor support and beyond said one side member, a drive shaft rotatably mounted in said drive shaft housing, and means on the outer end of said drive shaft for connection to a gardening implement and means for drivingly connecting said motor and said drive shaft whereby power may be transferred to the gardening implement.

3. A machine comprising a pair of side frame members arranged in side by side relation, one of said side members being inverted U-shape, cross members maintaining frame members in fixed position, a ground engaging wheel mounted on each leg of said one side member, corresponding opposed wheels on said other side member, a tubular guide member arranged in upstanding relation fixed to the bight portion of said one side member, an upstanding shaft slidably and rotatably mounted in said tubular guide member, a support pivotally connected to the lower end of said upstanding shaft and extending toward the other side member, a rod pivotally connected to the other end of said support and projecting upwardly, means for adjustable connection of said upstanding rod to said other side member for varying the elevation and the angularity of the position of said support, means for adjusting and fixing the vertical position of said vertical shaft, a drive shaft rotatably mounted on said support and projecting outwardly from beyond said one side member and adapted to have its outer end extend to the axis of at least one pair of opposite wheels, means on the outer end of said drive shaft providing for connection to an implement whereby the implement may be adjusted to different angular and vertical positions including a position in alignment with said opposite wheels, and power means for driving said drive shaft whereby power may be transferred to said implement.

4. The invention according to claim 3 in which one of said pairs of opposed wheels are caster wheels.

5. A gardening machine comprising a frame, ground engaging wheels mounted on said frame, an upstanding shaft slidably and rotatably mounted in said frame adjacent one side thereof, a motor support pivotally connected to the lower end of said upstanding shaft, said motor support extending toward the other side of said frame, a rod pivotally connected to the other end of said motor support and projecting upwardly, spaced supporting means for connection to said upstanding rod for varying the elevation and the angularity of the position of said motor support, means for adjusting and fixing the vertical position of said vertical shaft, a motor on said motor support, a drive shaft housing projecting outwardly from said motor support and beyond said one side of said frame, a drive shaft rotatably mounted in said drive shaft housing, means on the outer end of said drive shaft for connection to a gardening implement, and means for drivingly connecting said motor and said drive shaft whereby power may be transferred to a gardening implement.

6. The invention according to claim 5 in which a guard of arcuate shape with a rearwardly extending apron is adjustably mounted on the outer end of said drive shaft housing.

7. A machine comprising a pair of side frame members, cross members maintaining said frame members in fixed position, ground engaging means on said machine, a motor support on said machine, a motor having a drive pulley fixed on said motor support, a drive shaft housing, a drive shaft having a pulley rotatably mounted on said drive shaft housing, and means for securing an implement to said drive shaft whereby power may be transferred to said implement, a driving belt extending between said pulleys, upstanding loop members on said motor support on opposite sides of said pulleys, brackets on said drive shaft housing in engagement with said loop members, securing bolts extending through said loops and said brackets, adjusting screws extending through the bight portion of said loops and engageable with said securing bolts for positioning said drive shaft pulleys in definite relation to said motor pulleys for adjusting the driving belt.

8. A gardening machine comprising a frame, means for supporting said frame for movement over the ground, a cutting implement mounted on said frame for adjustable movement toward and away from the ground, a handle lever pivotally mounted on said frame for guiding the machine in use, a cable interconnecting said pivoted handle lever and said vertically movable cutting implement while permitting the pivotal movement of said pivoted handle lever, and an adjustable strut connected to said pivoted handle lever and to a fixed portion of said frame for maintaining the pivoted handle lever of the machine in adjusted position and thereby maintain the implement in operative position.

9. A machine for cutting material adjacent the edges of sidewalks, lawns, and curbs comprising a vehicle, a vertically extending guideway mounted on said vehicle adjacent one side thereof, a slide mounted in said vertically extending guideway, a shaft housing pivotally mounted on the lower end of said slide and having a portion projecting outwardly beyond said one side of said vehicle, a motor mounted on said vehicle, a shaft rotatably mounted in said housing and drivingly connected to said motor and having a portion projecting beyond said one side of said vehicle, a rotatable cutter element fixed on said shaft spaced outwardly from said one side of said vehicle, means to maintain said slide in a definite vertical position and means in addition to said slide for adjustably retaining said housing in a definite position with respect to said vehicle whereby the angularity of said shaft and the cutter element may be varied with respect to the ground and with respect to the path of movement of said vehicle, said vehicle having four ground-engaging wheels arranged in spaced relation for stability and the axis of said cutter being located above the bottom of said motor whereby the stability of said machine is improved.

10. A surface trenching machine comprising a frame for movement over the surface, a generally horizontally extending drive shaft rotatably mounted on said frame, at least one cutting blade on said shaft, a toothed guarding wheel rotatably mounted on said shaft adjacent to and spaced from said cutting blade with the toothed wheel being of a greater diameter than said cutting blade, means cooperating with the toothed wheel for normally maintaining said toothed wheel in non-rotatable condition during the rotation of said shaft, said machine being usable to trench a surface adjacent to obstructions in said surface whereby in normal use the toothed wheel may penetrate the surface and permit the cutting blade to cut into the surface but upon approaching an impenetrable obstruction the toothed wheel will ride over the obstruction displacing the shaft and cutting blade thereon to prevent the cutting blade from striking the obstruction thereby preventing the marring of the obstruction.

11. A surface trenching machine comprising a frame for movement over a surface, a drive shaft rotatably mounted on said frame, at least one cutting blade fixed on the shaft, a toothed guarding wheel on said shaft adjacent to and spaced from said cutter blade with said toothed wheel being of diameter greater than said cutting blade, said teeth constraining the toothed wheel for rotation in accordance with a rolling action of the toothed wheel on the surface during the rotation of said shaft, said machine being usable to trench a surface adjacent to obstructions in said surface whereby in normal use the toothed wheel may penetrate the surface and permit the cutting blade to cut into the surface but upon approaching an obstruction the toothed wheel will ride over the obstruction displacing the shaft and cutting blade thereon to prevent the cutting blade from striking the obstruction thereby preventing marring of the obstruction.

12. A gardening machine comprising a frame for movement over the surface, a generally horizontally extending drive shaft rotatably mounted on said frame, a cutting blade fixedly mounted on the drive shaft, a guarding wheel freely rotatably mounted on said shaft adjacent to and spaced from said cutting blade for preventing said cutting blade from contacting obstructions, an eccentric weight mounted on said guarding wheel for normally maintaining said guarding wheel in non-rotatable condition during the rotation of said drive shaft, said machine being usable for a gardening operating whereby the guarding wheel prevents marring contact of the cutting blade with the obstructions.

References Cited in the file of this patent

UNITED STATES PATENTS

| | | |
|---|---|---|
| 1,313,866 | Sopousek | Aug. 19, 1919 |
| 1,849,122 | Thomson | Mar. 15, 1932 |
| 1,879,856 | Peterson | Sept. 27, 1932 |
| 1,890,810 | Gast | Dec. 13, 1932 |
| 2,318,051 | Brace | May 4, 1943 |
| 2,501,364 | Traver | Mar. 21, 1950 |
| 2,539,174 | Baideme et al. | Jan. 23, 1951 |
| 2,555,441 | Hackney | June 5, 1951 |
| 2,619,891 | Sloper | Dec. 2, 1952 |
| 2,630,747 | Mintz | Mar. 10, 1953 |
| 2,651,530 | Blydenburgh | Sept. 8, 1953 |
| 2,660,847 | Britten | Dec. 1, 1953 |
| 2,669,067 | Severance | Feb. 16, 1954 |
| 2,669,826 | Watrous | Feb. 23, 1954 |
| 2,672,002 | Nelson | Mar. 16, 1954 |
| 2,675,645 | Deppe | Apr. 20, 1954 |
| 2,707,363 | Beranek et al. | May 3, 1955 |
| 2,739,437 | True | Mar. 27, 1956 |
| 2,759,319 | Smith | Aug. 21, 1956 |

FOREIGN PATENTS

| | | |
|---|---|---|
| 837,183 | Germany | Apr. 21, 1952 |